US 11,912,260 B2

(12) United States Patent
Tarandek et al.

(10) Patent No.: US 11,912,260 B2
(45) Date of Patent: Feb. 27, 2024

(54) BRAKE SYSTEM INCLUDING A MASTER CYLINDER WITH AN ELASTIC PEDAL FEEL ELEMENT

(71) Applicant: MANDO CORPORATION, Pyeongtaek-si (KR)

(72) Inventors: Kristijan Tarandek, Neu-Isenburg (DE); Hans-Jörg Feigel, Rosbach (DE); I-Che Chiang, Frankfurt am Main (DE); Priti Kumari, Frankfurt Am Main (DE)

(73) Assignee: MANDO CORPORATION, Pyeongtaek-si (KR)

( * ) Notice: Subject to any disclaimer, the term of this patent is extended or adjusted under 35 U.S.C. 154(b) by 430 days.

(21) Appl. No.: 17/413,938

(22) PCT Filed: Dec. 16, 2019

(86) PCT No.: PCT/KR2019/017826
§ 371 (c)(1),
(2) Date: Jun. 14, 2021

(87) PCT Pub. No.: WO2020/122689
PCT Pub. Date: Jun. 18, 2020

(65) Prior Publication Data
US 2022/0032889 A1    Feb. 3, 2022

(30) Foreign Application Priority Data

Dec. 14, 2018  (DE) .................... 10 2018 221 757.2

(51) Int. Cl.
*B60T 13/66*    (2006.01)
*B60T 8/32*    (2006.01)
(Continued)

(52) U.S. Cl.
CPC ............ *B60T 8/326* (2013.01); *B60T 8/4081* (2013.01); *B60T 8/94* (2013.01); *B60T 13/142* (2013.01);
(Continued)

(58) Field of Classification Search
CPC .......... B60T 8/326; B60T 8/4081; B60T 8/94; B60T 13/62; B60T 13/142; B60T 13/686;
(Continued)

(56) References Cited

U.S. PATENT DOCUMENTS 4,004,839 A    1/1977  Burgdorf
5,327,724 A    7/1994  Tribuzio et al.
(Continued)

FOREIGN PATENT DOCUMENTS

DE    102015213551 A1 *  1/2017  ............. B60T 13/12
JP    2006256408 A  *  9/2006  ................ B60T 8/17
KR    10-2018-0045568 A    5/2018

OTHER PUBLICATIONS

International Search Report dated Apr. 21, 2020 for corresponding International Patent Application No. PCT/KR2019/017826.
(Continued)

*Primary Examiner* — Christopher P Schwartz
(74) *Attorney, Agent, or Firm* — Hauptman Ham, LLP

(57) ABSTRACT

A brake system comprises a reservoir; a brake pedal; a master cylinder including a first master chamber, a second master chamber, a first master piston, and a second master piston; a first hydraulic circuit including at least one first hydraulic wheel brake; a second hydraulic circuit including at least one second hydraulic wheel brake; and a hydraulic pressure supplier including an actuator for pressurizing the first hydraulic circuit and the second hydraulic circuit depending on an operation of the brake pedal in a normal operating mode. The master cylinder further comprises a
(Continued)

locking chamber and an elastic pedal feel element arranged in the first master chamber to be in contact with the first master piston and the second master piston for generating a pedal force when the brake pedal is operated while the second master piston is locked in the normal operating mode.

10 Claims, 2 Drawing Sheets

(51) Int. Cl.
  *B60T 8/40* (2006.01)
  *B60T 8/94* (2006.01)
  *B60T 13/14* (2006.01)
  *B60T 13/62* (2006.01)
  *B60T 13/68* (2006.01)

(52) U.S. Cl.
  CPC ............ *B60T 13/62* (2013.01); *B60T 13/686* (2013.01); *B60T 2270/402* (2013.01); *B60T 2270/404* (2013.01); *B60T 2270/82* (2013.01)

(58) Field of Classification Search
  CPC ......... B60T 2270/402; B60T 2270/404; B60T 2270/82
  USPC ....................... 303/114.1, 114.3, 115.2, 119.2
  See application file for complete search history.

(56) References Cited

U.S. PATENT DOCUMENTS

| | | | | |
|---|---|---|---|---|
| 5,729,979 | A | * | 3/1998 | Shaw ...................... B60T 7/042 60/533 |
| 7,331,641 | B2 | * | 2/2008 | Kusano ................... B60T 13/74 303/114.1 |
| 7,410,223 | B2 | * | 8/2008 | Kusano ..................... B60T 7/12 303/119.2 |
| 11,590,950 | B2 | * | 2/2023 | Jeong .................... B60T 8/1755 |
| 2011/0115282 | A1 | | 5/2011 | Dinkel et al. |
| 2013/0214587 | A1 | | 8/2013 | Yang |
| 2014/0159473 | A1 | | 6/2014 | Kuhlman |
| 2015/0021977 | A1 | | 1/2015 | Miwa et al. |
| 2015/0097418 | A1 | * | 4/2015 | Koo ....................... B60T 11/20 303/14 |
| 2018/0162341 | A1 | | 6/2018 | Irwan et al. |
| 2022/0017051 | A1 | * | 1/2022 | Kim ..................... B60T 13/662 |
| 2022/0041149 | A1 | * | 2/2022 | Tarandek ................ B60T 13/14 |
| 2022/0089136 | A1 | * | 3/2022 | Tarandek .............. B60T 13/142 |

OTHER PUBLICATIONS

Written Opinion dated Apr. 21, 2020 for corresponding International Patent Application No. PCT/KR2019/017826.

* cited by examiner

BRAKE SYSTEM INCLUDING A MASTER CYLINDER WITH AN ELASTIC PEDAL FEEL ELEMENT

CROSS-REFERENCE TO RELATED APPLICATION

The present application is a national stage filing under 35 U.S.C § 371 of PCT application number PCT/KR2019/017826 filed on Dec. 16, 2019 which is based upon and claims the benefit of priorities to German Patent Application No. 10 2018 221 757.2, filed on Dec. 14, 2018, in the German Intellectual Property Office, which is incorporated herein in its entirety by reference.

TECHNICAL FIELD

The present invention relates to a brake system. More particularly, the invention relates to a brake system comprising a hydraulic pressure supplier for pressurizing hydraulic circuits depending on an operation of a brake pedal in a normal operating mode of the brake system.

BACKGROUND ART

A conventional powered braking system is shown for example in FIG. 1 of US 2014/0159473 A1. In such a conventional brake system, a pedal travel sensor is coupled to a brake pedal and operable to detect an amount of travel of the brake pedal, so that a corresponding signal can be sent to a controller. The controller interprets the signal and sends a further signal to a hydraulic pressure supplier including an actuator. In turn, the actuator pressurizes braking fluid to operate hydraulic wheel brakes. Furthermore, a separate pedal feel simulator is provided to mimic the feel and travel present during braking of a conventional braking system that supplies fluid directly from a master cylinder to wheel cylinders.

However, the design of such conventional braking systems can be rather complicated and space consuming due to a relatively large number of parts.

DISCLOSURE

Technical Problem

It is the object of the present invention to provide a compact braking system, preferably having a reduced number of parts. Furthermore, it would be advantageous to reduce manufacturing costs of the braking system.

Technical Solution

The present invention has been made to solve at least one of the above mentioned objects.

According to claim 1, a brake system is provided, comprising a reservoir for storing a brake fluid; A brake pedal; a master cylinder including a first master chamber, a second master chamber, a first master piston, and a second master piston, the first master piston being directly displaceable by operating the brake pedal and the second master piston being a floating piston and separating the first master chamber, which is between the first master piston and the second master piston, from the second master chamber; a first hydraulic circuit including at least one first hydraulic wheel brake; a second hydraulic circuit including at least one second hydraulic wheel brake; and a hydraulic pressure supplier including an actuator for pressurizing the first hydraulic circuit and the second hydraulic circuit depending on an operation of the brake pedal in a normal operating mode of the brake system.

The first master chamber is hydraulically connected to the first hydraulic circuit for pressurizing the first hydraulic circuit in an emergency mode of the brake system and the second master chamber is hydraulically connected to the second hydraulic circuit for pressurizing the second hydraulic circuit in the emergency mode.

Furthermore, the master cylinder further comprises a locking chamber between the second master piston and an inner wall of the master cylinder, wherein the locking chamber is hydraulically connected to the first master chamber via a first cut-off valve so that the second master piston can be locked in a locking position by closing the first cut-off valve in the normal operating mode.

In addition, an elastic pedal feel element is arranged in the first master chamber to be in contact with the first master piston and the second master piston for generating a pedal force when the brake pedal is operated while the second piston is locked in the normal operating mode.

As the second master piston is locked in the normal operating mode, said second master piston is not displaceable in the normal operating mode. As a result of the locking of the second master piston, a volume of the second master chamber and a volume of the locking chamber can be substantially constant in the normal operating mode. When the brake pedal is operated in the normal operating mode, the first master piston is advanced towards the second master piston thereby resulting in a deformation of the elastic pedal feel element. The driver thus experiences a counterforce when the brake pedal is operated. In the proposed brake system, the elastic pedal feel element can mimic the pedal force of a conventional braking system during a braking action. Thus, the elastic pedal feel element can function as a pedal simulator. As the elastic pedal feel element is integrated in the master cylinder, no separate pedal simulator or additional switching or locking valves are required. Therefore, compared with conventional brake systems a compact brake system having a reduced number of parts can be provided.

The emergency mode may be used as a back-up mode/hydraulic fall-back mode, for instance when there is a power failure or when the hydraulic pressure supplier or one or more electrically actuated valves do not function properly. In the emergency mode braking fluid can be supplied directly from the master cylinder to the hydraulic circuits. Thus, not only does the brake system provide a master cylinder with an integrated pedal simulator in the normal operating mode, the brake system may also allow operating the hydraulic wheel brakes in case of an emergency.

The second master piston can be unlocked in the emergency mode. In this way, the second master piston can be displaced thereby changing a volume of the second master chamber. For instance, the first cut-off valve can be opened in the emergency mode to establish a hydraulic connection between the locking chamber and the first master chamber. As the second master chamber is hydraulically connected to the second hydraulic circuit in the emergency mode, the second hydraulic circuit can be pressurized upon operation of the brake pedal. Preferably, the hydraulic connection between the pressure supplier and the hydraulic circuits is blocked in the emergency mode, e.g. by dedicated check valves.

A spring may be arranged in the second master chamber biasing the second master piston towards the first master piston and towards the locking position. The spring may facilitate urging the second master piston back to its locking position when changing from the emergency mode to the normal operating mode and/or when changing from a brake position towards a non-braking position in the emergency mode. The non-braking position (rest position) of the second master piston in the emergency mode may correspond to the locking position of the second master piston in the normal operating mode.

In an embodiment, the pressure supplier is hydraulically connected to the locking chamber via a check-valve for pressurizing the locking chamber in the normal operating mode. In this way, it can be ensured that the second master piston can be locked in the normal operating mode. The pressure in the locking chamber may be constant at least during non-braking periods in the normal operating mode. For example, the pressure inside the locking chamber may equal the pressure of the brake fluid supplied by the pressure supplier in the normal operating mode. As the first master piston pushes against the elastic pedal feel element during a brake action, which in turn pushes against the second master piston, the pressure of the brake fluid in the locking chamber may be somewhat increased.

The locking chamber may be located between an outer surface of the second master piston and the inner wall of the master cylinder. Furthermore, the locking chamber may be delimited by a step in the wall of the master cylinder and a collar of the second master piston. Furthermore, the locking chamber may have an annular shape and/or may surround the second master piston.

In one embodiment, the first master chamber is hydraulically connected to the reservoir via a second cut-off valve. The second cut-off valve can be opened in the normal operating mode. The fluid displaced by the first master piston in the first master chamber may be directed to the reservoir via the second cut-off valve. This implementation may prevent building-up pressure in the first master chamber during a braking action in the normal operating mode and may facilitate the usage of the pedal simulator.

It can be envisaged that the first cut-off is a normally open valve (NO valve). The second cut-off valve may be a normally closed valve (NC valve). Further, the first and/or second cut-off valves may be solenoid valves that can be electrically actuated, e.g. by corresponding control signals from a control unit (see below).

In the emergency mode, the second cut-off valve can be closed. Furthermore, by opening the first cut-off valve in the emergency mode, the first master chamber and the locking chamber are hydraulically connected and are also hydraulically connected to the first hydraulic circuit. Thus, the at least one first hydraulic wheel brake can be operated by supplying pressurized brake fluid from the master cylinder in the emergency mode.

Generally, after the hydraulic circuits have been pressurized by the hydraulic pressure supplier, and when the hydraulic wheel brakes are released, the pressure in the hydraulic wheel brakes is relieved by discharging the brake fluid to the reservoir. According to an implementation form, a first pressure relief path is formed from the first hydraulic circuit to the reservoir via the first master chamber for depressurizing the first hydraulic circuit in the normal operating mode. Additionally or alternatively, a second pressure relief path is formed from the second hydraulic circuit to the reservoir via the second master chamber for depressurizing the second hydraulic circuit in the normal operating mode.

Preferably, the first pressure relief path between the first hydraulic circuit and the first master chamber includes the same hydraulic fluid line or the same hydraulic fluid lines as the hydraulic connection between the first hydraulic circuit and the first master chamber for pressurizing the first hydraulic circuit in the emergency mode. Moreover, the second pressure relief path between the second hydraulic circuit and the second master chamber may comprise the same hydraulic fluid line or the same hydraulic fluid lines as the hydraulic connection between the second hydraulic circuit and the second master chamber for pressurizing the second hydraulic circuit in the emergency mode. By using the same hydraulic fluid lines the number of parts can be further reduced and a compact system can be provided. Alternatively, different hydraulic fluid lines may be used for the pressure relief paths in the normal operating mode and the hydraulic connection for pressurizing the hydraulic circuits in the emergency mode.

The first and/or second hydraulic circuits may comprise two cut-off valves per hydraulic wheel brake. Said cut-off valves may be a pressure supply valve for pressurizing the hydraulic wheel brake and a pressure relief valve for depressurizing the hydraulic wheel brake. The pressure relief valve may hydraulically connect the hydraulic circuit and the corresponding pressure relief path. The pressure supply valve may hydraulically connect the hydraulic circuit and the hydraulic pressure supplier. Both cut-off valves may be normally open valves.

The reservoir may be hydraulically connected to the first master chamber and/or the second master chamber and/or the locking chamber for filling the respective chambers when the brake pedal is not operated (i.e. is in its rest position). Typically, a first brake fluid supply path hydraulically connects the reservoir and a first inlet of the first master chamber. Further, a second brake fluid supply path hydraulically connects the reservoir and a second inlet of the second master chamber. The first and/or second inlet may be open when the first master piston and/or the second master piston are in a rest position. The corresponding inlet may be closed when the first master piston and/or the second master piston are moved out of the rest position by the brake pedal. By this arrangement the first master chamber and/or the second master chamber and/or the locking chamber can be filled with brake fluid at least during non-braking periods. Said hydraulic connection/connections may be blocked during a braking action in the emergency mode.

The elastic pedal feel element may comprise a body, which may be a solid body. Furthermore, the body of the elastic pedal feel element may be an elongated body having a first axial end portion, an opposing second axial end portion and an intermediate portion therebetween. Furthermore, a longitudinal direction of the elongate body may be axially aligned with the master cylinder. Optionally, a centreline of the elongate body may coincide with a centreline of the master cylinder. The first axial end portion of the body may be in contact with the first master piston, while the second axial end portion of the body may be in contact with the second master piston. The elastic pedal feel element may comprise a progressive spring characteristic. In this way, the pedal travel and feel experienced by the driver may be improved. The body may include a tapered portion. For instance, the second end portion may be tapered. The intermediate portion may be cylindrical in shape and may have a constant diameter. The first end portion may have a diameter that is greater than the diameter of the intermediate portion and the second axial end portion. The first master piston and/or the second master piston may each include a recess that receives at least a part of the elastic pedal feel element. The corresponding recess may be formed such to allow the elastic pedal feel element to be compressed in the axial direction, i.e. expanded in a radial direction inside the recess. When the brake pedal is completely depressed, the elastic pedal feel element may be deformed such to snugly fit in the recess. The elastic pedal feel element may be integrally formed of an elastomer. The elastic pedal feel element can be designed for a compressive loading.

The present invention is not limited to two pistons. In one embodiment, a third floating piston can be arranged in parallel to the second master piston, for instance, in case of large wheel brake volume consumption and a short pedal stroke. In this configuration, an advantage may be that the sealing for this piston can be tested without a second seal with reservoir connection in between the seals.

In one implementation form, the brake system comprises a pedal sensor for detecting an operation of the brake pedal. Furthermore, a control unit may be envisaged for activating the hydraulic pressure supplier and/or controlling control valves comprised by the first and the second hydraulic circuit depending on sensor signals of the pedal sensor.

The control unit may be configured for keeping the first cut-off valve closed and the second cut-off valve open in the normal operating mode and/or for opening the first cut-off valve and closing the second cut-off valve in order to switch the brake system in the emergency mode when a failure is detected.

Advantageous Effects

The brake system including a master cylinder with an elastic pedal feel element according to the various embodiments of the present disclosure may be used for a compact braking system, preferably having a reduced number of parts. Furthermore, it would be advantageous to reduce manufacturing costs of the braking system.

DESCRIPTION OF DRAWINGS

Various objects and advantages of the present invention will become apparent to those skilled in the art from the following detailed description of embodiments, when read in light of the accompanying drawings.

There are shown in

BEST MODE

Figure 1:
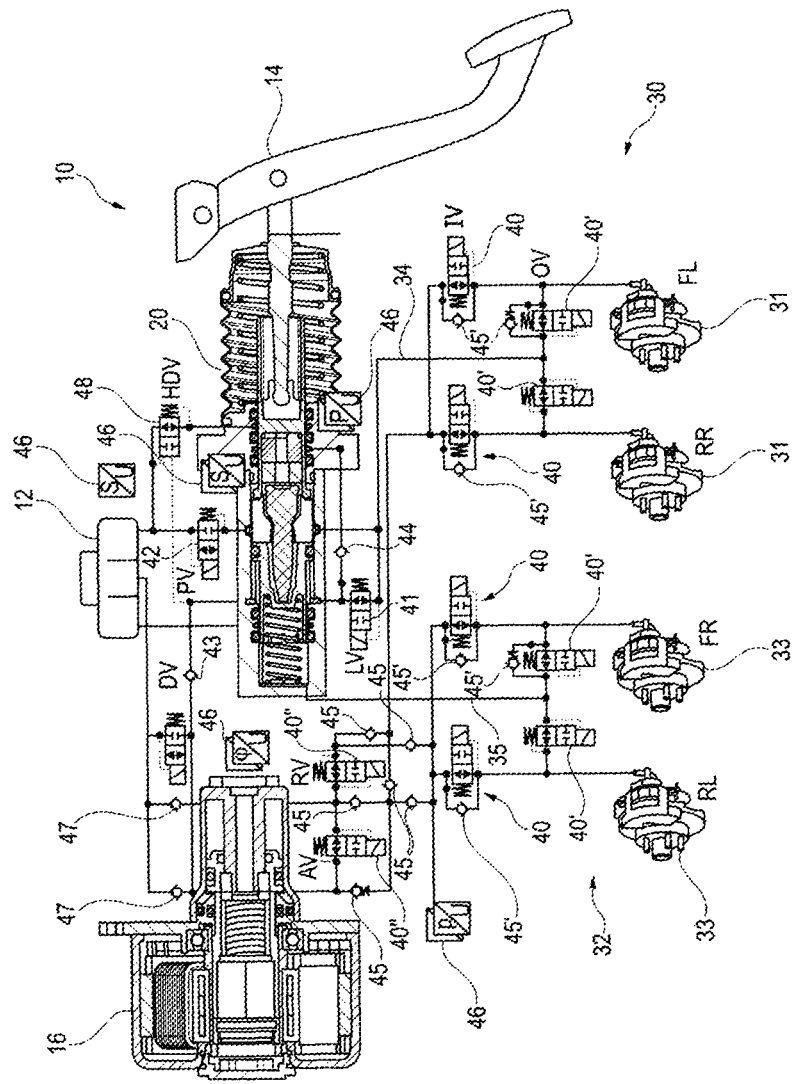
FIG. 1 a schematic diagram of a brake system.

In the following, recurring and similar features in this and in the subsequent representations are provided with the same reference numerals.

FIG. 1 shows a schematic diagram of a brake system 10. The illustrated system 10 is provided with dual hydraulic circuits 30, 32 each including two hydraulic wheel brakes 31, 33. The number of hydraulic wheel brakes 31, 33 per hydraulic circuit may vary. For instance a higher number (e.g. three or more) or smaller number (e.g. one) of wheel brakes 31, 33 per hydraulic circuit are also contemplated by the present invention. The brake system 10 comprises a brake pedal 14, a return spring 15 biasing the brake pedal 14 in the return direction and an input rod 13 connected to the brake pedal 14. In the brake system 10 of FIG. 1, a brake pedal travel sensor (not shown) is coupled to the brake pedal 14 and operable to detect an amount of travel of the brake pedal 14, so that a corresponding signal can be sent to a controller (not shown). The controller may send a signal to a hydraulic pressure supplier 16 which comprises an actuator for pressurizing brake fluid to operate the hydraulic wheel brakes 31, 33 depending on an operation of the brake pedal in a normal operating mode of the brake system 10. The brake fluid is stored in reservoir 12 that is hydraulically connected to the pressure supplier 16 by dedicated fluid lines and via two check valves 47.

The first and second hydraulic circuits 30, 32 comprise a plurality of cut-off valves 40, 40' that can be selectively controlled by the controller. The cut-off valves 40, 40' may be 2/2 way solenoid valves. The cut-off valves 40 are positioned between the pressure supplier 16 and each of the hydraulic wheel brakes 31, 33 such that movement of hydraulic fluid from the pressure supplier 16 and to the hydraulic wheel brakes 31, 33 can be selectively enabled and selectively blocked via operation of the cut-off valves 40. Furthermore, the cut-off valves 40' are positioned between the hydraulic wheel brakes 31, 33 and the reservoir 12 such that movement of hydraulic fluid from the hydraulic wheel brakes 31, 33 and to the reservoir 12 can be selectively enabled and selectively blocked via operation of the cut-off valves 40'. The first and second hydraulic circuits 30, 32 may also comprise a plurality of check valves 45'. Furthermore, a plurality of cut-off valves 40'' that may be designed as 2/2 way solenoid valves and a plurality of check valves 45 are located between the pressure supplier 16 and the first and second hydraulic circuits 30, 32. To improve control of the brake system 10, several parameters may be monitored by a plurality of sensors 46, such as pressure and distance sensors. The output of the sensors 46 is directed to the controller.

The operation of the first and second hydraulic circuits 30, 32 and the hydraulic pressure supplier 16 may be apparent for the skilled person from FIG. 1 and not outlined in detail for the sake of brevity.

Thus, in the normal (powered) operation mode of the brake system 10, depression of the brake pedal 14 does not directly apply braking force to the hydraulic wheel brakes 31, 33 through the brake fluid, but rather, the brake fluid is provided to the hydraulic wheel brakes 31, 33 by the hydraulic pressure supplier 16 and control of the solenoid valves 40, 40' in the first and second hydraulic circuits 30, 32.

The brake system 10 further comprises a master cylinder 20 that performs two functions, namely operation of the hydraulic wheel brakes 31, 33 in an emergency mode and simulation of the brake pedal 14 in the normal operating mode. These functions will become apparent from the following description.

Figure 2:
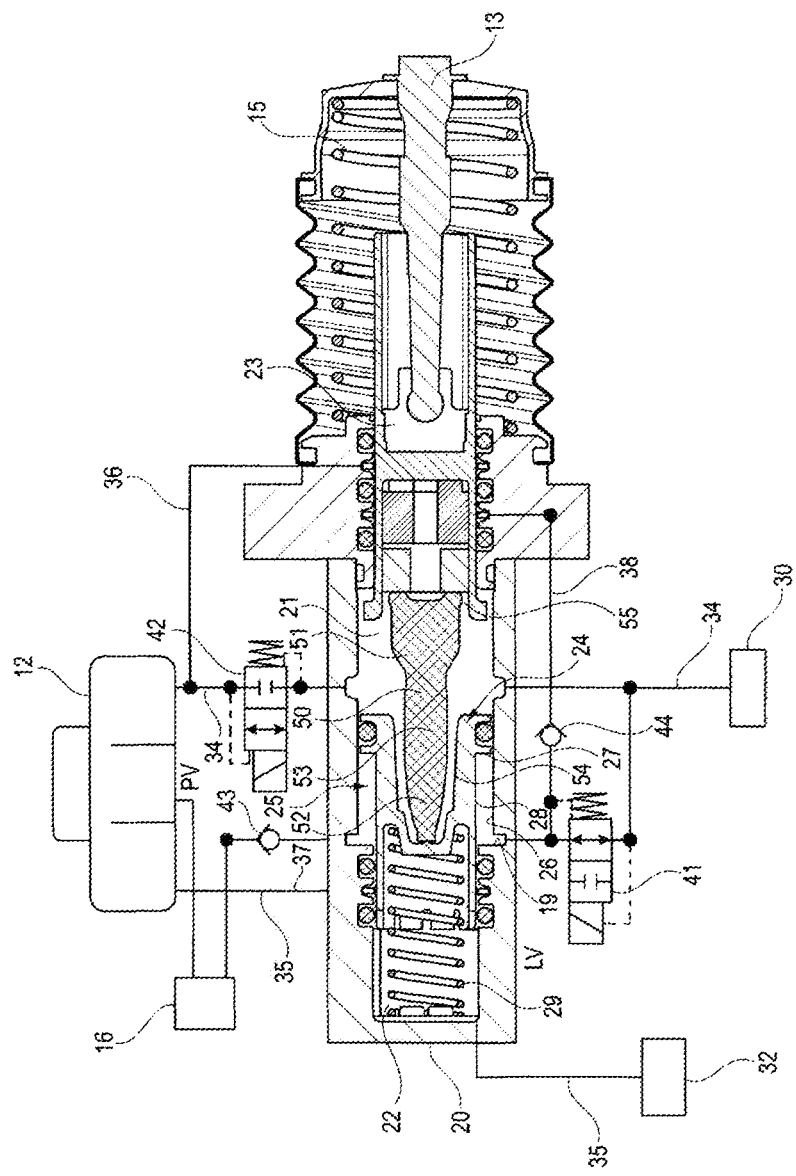
FIG. 2 a portion of the brake system of FIG. 1.

As can be seen from FIG. 2, the master cylinder 20 includes a first master chamber 21, a second master chamber 22, a first master piston 23, and a second master piston 24. The first master piston 23 is configured to be moveable under the brake operating force transmitted from the brake pedal 14 through the input rod 13. Thus, the first master piston 23 is directly displaceable by operating the brake pedal 14.

The second master piston 24 is a floating piston that separates the first master chamber 21, which is between the first master piston 23 and the second master piston 24, from the second master chamber 22.

The master cylinder 20 further comprises a locking chamber 25 between an outer surface 28 of the second master piston 24 and an inner wall 26 of the master cylinder 20. The locking chamber 25 may be delimited by a step 19 in the inner wall 26 of the master cylinder 20 and a collar 27 of the second master piston 24. In a preferred embodiment, the locking chamber 25 has an annular shape and surrounds the second master piston 24.

The locking chamber 25 is hydraulically connected to the first master chamber 21 via a first cut-off valve 41 so that the second master piston 24 can be locked in a locking position by closing the first cut-off valve 41 in the normal operating mode. A coil spring 29 is arranged in the second master chamber 22 biasing the second master piston 24 towards the first master piston 23 and towards the locking position. Optionally, the first master chamber 21 is hydraulically connected to the reservoir 12 via a second cut-off valve 42. The first cut-off valve 41 may be a normally open valve (NO valve) whereas the second cut-off 42 valve may be a normally closed valve (NC valve). The first and second cut-off valves 41, 42 may be solenoid valves that can be electrically actuated and controlled by the controller. Moreover, the first and second cut-off valves 41, 42 may be 2/2 way valves having two connections and two valve positions. The hydraulic pressure supplier 16 may be hydraulically connected to the locking chamber 25 via a check-valve 43 for pressurizing the locking chamber 25 in the normal operating mode. In this way, the volume of the locking chamber 25 and the pressure of the brake fluid inside the locking chamber 25 are more or less constant in the normal operating mode.

Several sealing members are disposed in corresponding grooves of the inner wall of the master cylinder and the second master piston 24 to seal the chambers 21, 22, 25 from each other and from the environment.

Furthermore, an elastic pedal feel element 50 is arranged in the first master chamber 21 for generating a pedal force when the brake pedal 14 is operated in the normal operating mode. The elastic pedal feel element is disposed between the first master piston 23 and the second master piston 24. Preferably, the elastic pedal feel element 50 may be integrally formed of an elastomer, such as rubber or silicone. In particular, the elastic pedal feel element 50 is designed for a compression force and has a progressive spring characteristic.

The elastic pedal feel element 50 may comprise an elongate, solid body. A longitudinal direction of the elongate body may be axially aligned with the master cylinder 20. In the embodiment shown, a centreline of the elongate body coincides with a centreline of the master cylinder 20. Furthermore, the body includes a first axial end portion 51, an opposing second axial end portion 52 and an intermediate portion 53 therebetween. The first axial end portion 51 of the body is in contact with the first master piston 23, while the second axial end portion 52 of the body is in contact with the second master piston 24.

The second end portion 52 may be tapered and optionally has a conical shape. The intermediate portion 53 may be cylindrical in shape and may have a substantially constant diameter. The first end portion 51 has a diameter that is greater than the diameter of the intermediate portion 53 and the second axial end portion 52. The second master piston 24 may include a recess 54 that receives the second axial end portion 52 and a part of the intermediate portion 53. The recess 54 may be formed such to allow the elastic pedal feel element 50 to be compressed in the axial direction and expanded in a radial direction inside the recess 54. When the brake pedal 14 is completely depressed, the elastic pedal feel element 50 is deformed such to snugly fit in the recess 54 of the second master piston 23. The first axial end portion 51 is formed to fit in a recess 55 formed by the first master piston 23. In both the normal operating mode and the emergency mode, the elastic pedal feel element 50 is retained between the first and second master pistons 23, 24.

In the following description, the normal operating mode and the emergency mode are described.

In the normal operating mode (powered operating mode), the first cut-off valve 41 is in its closed position, whereas the second cut-off valve 43 is in its open position. As a result, the second master piston 24 is locked in its locking position. When a user or driver depresses the brake pedal 14, the input rod 13 pushes the first master piston 24 further into the master cylinder 20. As the second master piston 24 is locked, the elastic pedal element 50 is compressed between the first master piston 23 and the second master piston 24. As a result, the driver experiences a brake pedal feel that he/she would also experience when operating a conventional brake system being solely hydraulically actuated during a brake action. In addition, the brake fluid inside the first chamber 21 is directed via the opened cut-off valve 42 to the reservoir 12.

Furthermore, the controller sends a signal to a hydraulic pressure supplier 16 depending on the position of the brake pedal 14. Furthermore, the controller controls and operates the cut-off valves 40, 40' of the first and second hydraulic circuits 30, 32 such that the first and second hydraulic circuits 30, 32 are pressurized and the hydraulic wheel brakes 31, 33 can be applied. More specifically, the valves 40 are opened while the valves 40' are closed so that the hydraulic wheel brakes 31, 33 can be operated.

When the user or driver releases the brake pedal 14, the return spring 15 urges the brake pedal 14 towards its non-braking default position.

Optionally, a first pressure relief path 34 is formed from the first hydraulic circuit 30 to the reservoir 12 via the first master chamber 21 and the second cut-off valve 43 in the normal operating mode. Additionally or alternatively, a second pressure relief path 35 is formed from the second hydraulic circuit 32 to the reservoir 12 via the second master chamber 22 in the normal operating mode. The brake pedal sensor measures that the brake pedal 14 returns to its default state and sends this information to the controller. Thereafter, the controller controls and operates the cut-off solenoid valves 40, 40' in the first and second hydraulic circuits 30, 32 such that the hydraulic connection to the pressure supplier 16 is blocked and the brake fluid is directed from the first and second hydraulic circuits 30, 32 via the pressure relief paths 34, 35 to the reservoir 12. More specifically, the cut-off valves 40 between the hydraulic pressure supplier 16 and the wheel brakes 31, 33 are closed, while the cut-off valves 40' between the wheel brakes 31, 33 and the master cylinder 20 are opened.

Thus, the brake fluid is directed from the hydraulic circuits 30, 32 and the hydraulic wheel brakes 31, 33 to the reservoir 12 via pressure relief paths 34, 35.

In the emergency operating mode (non-powered operating mode), the first cut-off valve 41 is in its opened position, whereas the second cut-off valve 42 is in its closed position. The cut-off valves 40, 40' and the check valves 45' of the first and second hydraulic circuits 30, 32 as well as the cut-off valves 40" and the check valves 45 between the hydraulic circuits 30, 32 and the pressure supplier 16 are designed such that the hydraulic connection between the pressure supplier 16 and the hydraulic circuits 30, 32 is blocked in the emergency mode. The cut-off valves 40, 40' are normally open valves and are opened in the emergency mode. Moreover, the first master chamber 21 is hydraulically connected to the first hydraulic circuit 30 for pressurizing the first hydraulic circuit 30 in an emergency mode of the brake system 10. Furthermore, the second master chamber 22 is hydraulically connected to the second hydraulic circuit 32 for pressurizing the second hydraulic circuit 32 in the emergency mode. Thus, the emergency or "no power" state of the system 10 puts the master cylinder 20 in hydraulic communication with the wheel brakes 31, 33 so that the driver's input to the brake pedal 14 directly causes braking.

When a user presses the brake pedal 14, the input rod 13 pushes the first master piston 23 further into the master cylinder 20. The second master piston 24 is urged into the second master chamber 22 and compresses spring 29. The pressure of the brake fluid inside the first master chamber 21, the second master chamber 22 and the locking chamber 25 is increased. This causes the first and second hydraulic circuits 30, 32 to be pressurized to operate the hydraulic wheel brakes 31, 33. After the braking action, the springs 15, 29 urge the first and second master pistons 23, 24, the input rod 13 and the brake pedal 14 back to their initial positions.

The reservoir 12 may be hydraulically connected to the first master chamber 21 and/or the second master chamber 22 by fluid lines 36, 37 (fluid supply paths 36, 37), respectively, for filling the respective chambers 21, 22 after a braking action, especially in the emergency mode. By this arrangement the first master chamber 21 and/or the second master chamber 22 can be filled with brake fluid at least during non-braking periods i.e. when the first master piston 23 and/or the second master piston 24 are in their rest positions. When the brake pedal 14 is depressed during a braking action, the hydraulic connection between the reservoir 12 and the respective chambers 21, 22 may be blocked. This may be accomplished by an opening in the master cylinder 20 and a corresponding opening formed in the first master piston 23 and/or the second master piston 24, wherein both openings fluidly communicate in a non-braking state. The openings in the master cylinder 20 may be located between the sealing members (see FIG. 2). The fluid communication may be blocked during a braking action. When the opening of the corresponding piston moves in axial direction, the openings of the master cylinder 20 and the respective piston cannot fluidly communicate with each other thereby blocking the hydraulic connection therebetween. Furthermore, the locking chamber 25 may be hydraulically connected to the reservoir 12 via second check valve 44, fluid line 38, the first master chamber 21 and fluid line 36. Similarly as described above, this hydraulic connection also serves to fill the locking chamber 25 during non-braking periods in the emergency mode. In the normal operating mode, the first and second check valves 43, 44 may ensure that the pressure inside the locking chamber 25 can be maintained.

Preferably, the first pressure relief path 34 between the first hydraulic circuit 30 and the first master chamber 21 includes the same hydraulic fluid line 34 as the hydraulic connection between the first hydraulic circuit 30 and the first master chamber 21 for pressurizing the first hydraulic circuit 30 in the emergency mode. Furthermore, it can be envisaged that the second pressure relief path 35 between the second hydraulic circuit 32 and the second master chamber 22 includes the same hydraulic fluid lines 35 as the hydraulic connection between the second hydraulic circuit 32 and the second master chamber 22 for pressurizing the second hydraulic circuit 32 in the emergency mode.

The pressure inside the chambers 21, 22, 25 is adapted to the pressure inside the reservoir 12 through the fluid lines 36, 37. In the non-braking state, the chambers 21, 22, 25 can be filled with brake fluid through fluid lines 36, 37, 38.

In the implementation form shown in FIG. 1, an optional cut-off valve 48 is situated between the reservoir 12 and the first master chamber 21 and may be used for testing the sealing between the first master piston 23 and the first master chamber 21. Valve 48 may be a hydraulically operated valve. Alternatively, the connection 36, 37 between the reservoir 12 and the first and/or second master chambers 21, 22 may not comprise valves (see FIG. 2).

It should be mentioned that the solenoid valves 40, 40', 40", 41, 42, 48 depicted in FIGS. 1 and 2 are shown in their default, non-powered states.

The wheel brakes 33 may comprise rear-left and front-right brakes, whereas the wheel brakes 31 may comprise rear-right and front-left brakes. Alternatively, the wheel brakes 33 may comprise rear-left and rear-right brakes, while the wheel brakes 31 may comprise front-left and front-right brakes.

Any features shown in the FIGS. 1-2 may be combined with each other or may be separately claimed.

The invention claimed is:

1. A brake system, comprising
a reservoir for storing a brake fluid;
a brake pedal;
a master cylinder including a first master chamber, a second master chamber, a first master piston, and a second master piston the first master piston being directly displaceable by operating the brake pedal and the second master piston being a floating piston and separating the first master chamber, which is between the first master piston and the second master piston from the second master chamber;
a first hydraulic circuit including at least one first hydraulic wheel brake;
a second hydraulic circuit including at least one second hydraulic wheel brake; and
a hydraulic pressure supplier including an actuator for pressurizing the first hydraulic circuit and the second hydraulic circuit depending on an operation of the brake pedal in a normal operating mode of the brake system,
wherein the first master chamber is hydraulically connected to the first hydraulic circuit for pressurizing the first hydraulic circuit in an emergency mode of the brake system and the second master chamber is hydraulically connected to the second hydraulic circuit for pressurizing the second hydraulic circuit in the emergency mode,
wherein the master cylinder further comprises a locking chamber between the second master piston and an inner wall of the master cylinder, wherein the locking chamber is hydraulically connected to the first master chamber via a first cut-off valve so that the second master piston can be locked in a locking position by closing the first cut-off valve in the normal operating mode, and
wherein an elastic pedal feel element is arranged in the first master chamber to be in contact with the first master piston and the second master piston for generating a pedal force when the brake pedal is operated while the second master piston is locked in the normal operating mode.

2. The brake system of claim 1, wherein the first cut-off valve is a normally open valve.

3. The brake system of claim 1, wherein the first master chamber is hydraulically connected to the reservoir via a second cut-off valve.

4. The brake system of claim 3, wherein the second cut-off valve is a normally closed valve.

5. The brake system of claim 1, wherein a spring is arranged in the second master chamber biasing the second master piston towards the first master piston and towards the locking position.

6. The brake system of claim 1, wherein the hydraulic pressure supplier is hydraulically connected to the locking chamber via a check-valve for pressurizing the locking chamber in the normal operating mode.

7. The brake system of claim 1, wherein the locking chamber has an annular shape and surrounds the second master piston.

8. The brake system of claim 1, wherein the locking chamber is located between an outer surface of the second master piston and the inner wall of the master cylinder and delimited by a step in the inner wall of the master cylinder and a collar of the second master piston.

9. The brake system of claim 1, further comprising
a first pressure relief path formed from the first hydraulic circuit to the reservoir via the first master chamber in the normal operating mode and/or
a second pressure relief path formed from the second hydraulic circuit to the reservoir via the second master chamber in the normal operating mode.

10. The brake system of claim 9, wherein the first pressure relief path between the first hydraulic circuit and the first master chamber includes the same hydraulic fluid line as the hydraulic connection between the first hydraulic circuit and the first master chamber for pressurizing the first hydraulic circuit in the emergency mode and/or the second pressure relief path between the second hydraulic circuit and the second master chamber includes the same hydraulic fluid line as the hydraulic connection between the second hydraulic circuit and the second master chamber for pressurizing the second hydraulic circuit in the emergency mode.

* * * * *